Figure 1:
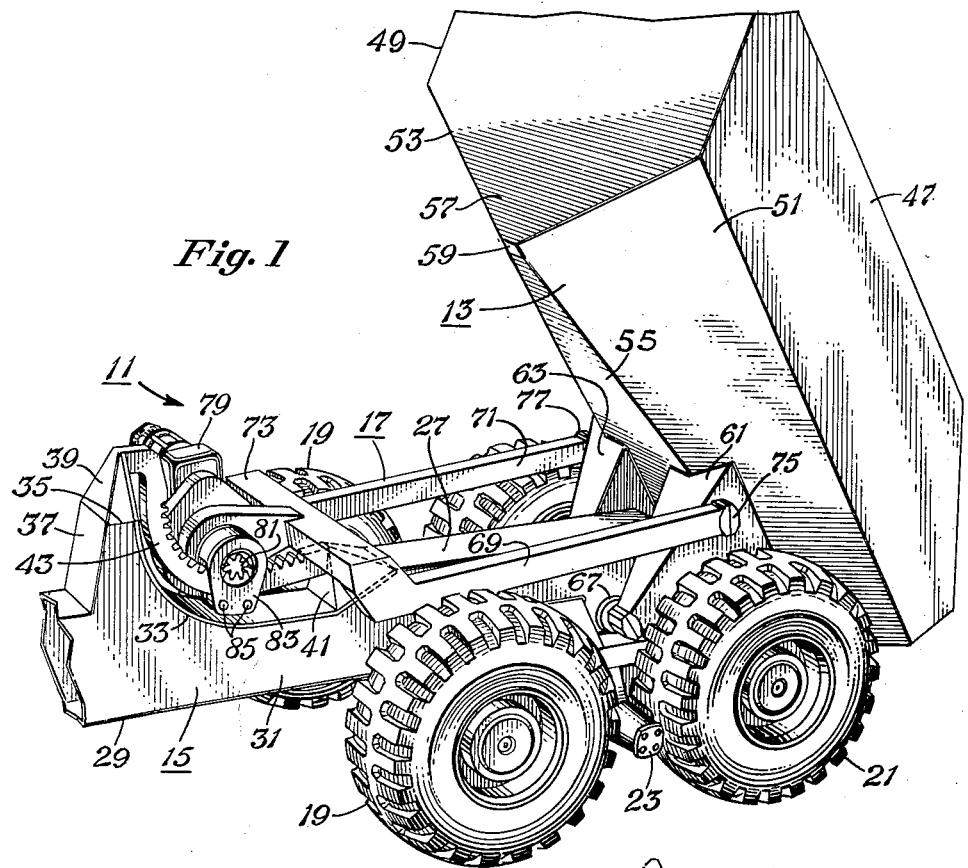

May 12, 1964    R. G. LE TOURNEAU    3,132,900
OPERATING MECHANISM FOR DUMP VEHICLE
Filed Jan. 8, 1963

INVENTOR.
Robert G. LeTourneau
BY Wm. T. Wofford
Attorney

United States Patent Office 3,132,900
Patented May 12, 1964

3,132,900
OPERATING MECHANISM FOR DUMP VEHICLE
Robert G. LeTourneau, P.O. Box 2307, Longview, Tex.
Filed Jan. 8, 1963, Ser. No. 250,105
2 Claims. (Cl. 298—19)

My invention relates to improvements in an operating mechanism for dump vehicles, and more particularly to operating mechanisms for such vehicles wherein variable mechanical advantage is desirable.

The mechanism with which the present invention is concerned involves pivoting movement of a structure under load from a first position to a second position, with the load decreasing as the movement progresses. An important application for such mechanism is in a load dumping vehicle, for example an earth hauling vehicle of the rear dump type. In such application, the force required to move and load is initially quite large, but decreases as the dump body is raised toward the dumping position. Numerous arrangements for such devices have been proposed in the prior art of which I am aware, but none have proven to be entirely satisfactory.

Accordingly, it is the general object of my invention to provide an improved operating mechanism for dump vehicles of the above-mentioned type.

Another object of my invention is to provide simple and effective vehicle dumping mechanism in an application wherein variable mechanical advantage is desired.

Another object of my invention is to provide improved vehicle dumping mechanism having minimal power requirements.

Another object of my invention is to provide improved vehicle dumping mechanism wherein the rate of dump body pivoting movement is correlated in an advantageous predetermined manner with the dump body angular position.

Another object of my invention is to provide an improved vehicle dumping mechanism with minimal space requirements.

The present invention contemplates a load hauling vehicle having a dump body pivotally fixed adjacent its rearward end to the vehicle chassis frame. Adjacent the dump body forward end there is fixed relative to the chassis frame and on suitable support structure an arcuate rack. The rack teeth face the dump body and extend downwardly and rearwardly, the rack being disposed in a plane perpendicular to the dump body pivot axis. A push beam structure is pivoted at one end to the dump body support structure about an axis parallel to and above the dump body pivot axis. The other end of the push beam structure is fixed to an electric motor driven gear reduction having an output pinion which is maintained in engagement with the rack. The rack curvature is made such that the ratio of downward movement to rearward movement of the pinion is initially quite large, but then decreases exponentially. In other words, the rack curvature is made such that the mechanism initially has a high mechanical advantage but slow rearward movement, and then the mechanical advantage decreases and the speed of rearward movement of the mechanism increases in an orderly manner and in general accordance with the magnitude of force required on the push beam structure as the dump body is moved from the loaded to the dumped position.

Figure 2:
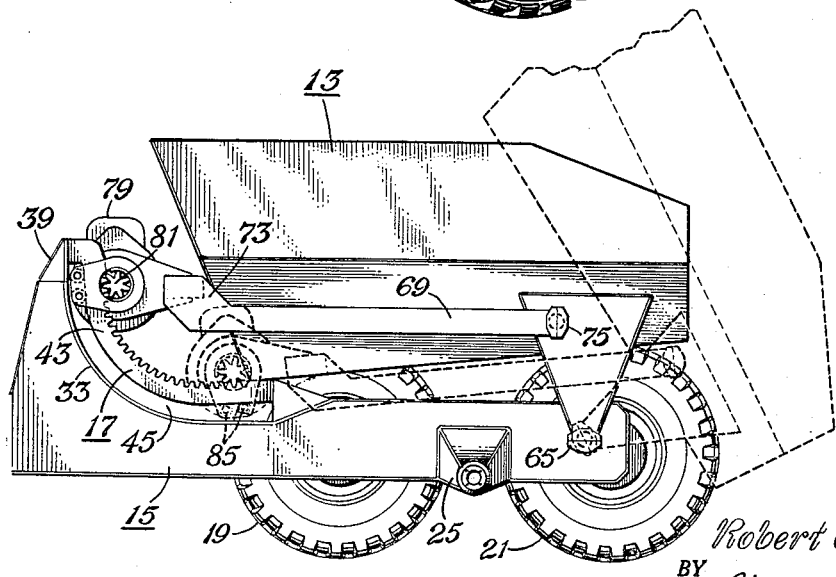

For a further understanding of my invention and for further objects, features and advantages thereof, reference may now be made to the following description taken in conjunction with the accompanying drawing in which:

FIG. 1 is a schematic perspective view of the left side of the rear portion of a rear-dump vehicle employing a dumping mechanism in accordance with a preferred embodiment of my invention; and FIG. 2 is a schematic elevational view of the left side of the vehicle of FIG. 1, with portions thereof omitted for clarification purposes.

Referring to FIG. 1, there is illustrated the rear portion of a vehicle 11 including a pivotable rear-dump body 13, a chassis frame 15 and a dump mechanism 17. The chassis frame 15 is supported on each side of its rear end by a pair of electric motor-driven wheels 19, 21. Each pair of wheels is mounted on a tandem bogey axle 23 which is supported by a plate structure 25 fixed perpendicularly to and projecting outwardly from the side of the frame 15. The frame 15 is made up of a structural box beam or girder having a pair of generally parallel top and bottom plates 27, 29 and a pair of vertical spaced apart side plates 31, disposed therebetween. From a point just in front of the axle of the wheels 19, the top girder plate 27 slopes generally downward and forward, and merges with an arcuate top plate portion 33. This arcuate plate portion 33 curves upwardly and frontwardly to a level portion 35 at some distance above the plane of the top plate 27. From this level portion 35, another top plate portion 37 slopes generally downward and forward, as shown in FIG. 1. The side plates 31, of course, are shaped to fit between the arcuate plate portion 33, the level portion 35, the loping portion 37 and the horizontal bottom plate 29. A rectangular pyramidal plate structure 39 is affixed to the frame 15 and to the level portion 35, so that it projects upwardly therefrom. Another pyramidal plate structure 41 is affixed to the sloping portion of the top plate 37 so that it projects upwardly therefrom. An arcuate length of rack 43 having its teeth directed toward the center of curvature of the rack is disposed with its ends fixed securely to the apices of the pyramidal structures 39, 41. For a purpose to be explained hereinafter, there is provided between the back of the rack 43 and the arcuate plate 33 a space 45.

The rear-dump body 13 is made up of a pair of generally parallel vertical side plates 47, 49, a pair of downwardly and inwardly sloping plates 51, 53, each fixed to the vertical side plates 47, 49 along one longitudinal edge, and a horizontal bottom plate 55 joining the free longitudinal edges of the sloping plates 51, 53. The front end of the body 13 is closed by a transverse end plate 57 secured to the sides and bottom plate by welding, or in any other suitable manner. A base plate 59 is fixed to the bottom plate where it connects with the end plate 57 for a purpose to be explained hereinafter. The rear end of the body 13 may be closed by pivotable and lockable tail gate (not shown), or in any appropriate manner. Near the rear end of the body 13, a pair of spaced apart support structures 61, 63 are fixed to the sloping and bottom plates and depend therefrom. The structures are generally formed in the shape of truncated pyramids which are fixed, at the larger or base ends, to the sloping side and bottom plates. Each pyramidal structure is provided at the smaller end thereof with a socket arrangement 65 which mates with a ball portion and a support structure 67 extending outwardly from the side plates 47, 49.

One end of each of a pair of push beams or arms 69, 71 is fixed to a respective end of a transverse yoke beam 73. The other end of each arm 69, 71 is pivotally connected by a ball and socket arrangement 75, 77 to the sides of the pyramidal support structures 61, 63 near the bases thereof.

An electric motor-driven gear reduction 79 is mounted on the yokebeam 73 near the mid-point thereof. The gear reduction 79 has an output pinion 81 which is so disposed that it engages the teeth of the arcuate rack 43. The gear reduction 79 is provided with a pivotable pinion housing 83 which supports a pair of back-up rollers 85 that engage the back surface of the rack 43 and move within the space 45.

The general arrangement of the arms 69, 71, the yoke 73, the rack 43, the gear reduction 79 and the ball and sockets 75, 77 is such that, when the vehicle body 13 is substantially horizontal, and the arms 69, 71 are also substantially horizontal, the pinion 81 and the gear reduction 79 are at the upper extreme end of the rack 43, as indicated in FIG. 2 by the solid lines.

Now, in order to describe the manner in which the dump mechanism operates, reference is made to the drawing and particularly to FIG. 2. The dump-body 13 is disposed initially in a horizontal manner with the base plate 59 resting on the yoke beam 73. The electric motor-driven gear reduction 79 is actuated, whereupon the pinion 81 rotates. Since the rack 43 is fixed, the pinion 81 and the gear reduction 79, as well as the yoke beam 73 to which it is fastened, move downward and rearward relative to the rack 43. During the downward and rearward movement, the arms 69, 71 exert a force on the ball and socket arrangement 75. This force forms a couple acting about an axis of rotation in the ball members of the ball and socket arrangement 65, 67. The force couple so produced, however, is resisted by a couple made up of the sum of the weight of the body 13 and the load it carries acting about the same axis of rotation. But, when the force couple exerted by the arms 69, 71 overcomes the weight couple, the body 13 pivots upwardly about the axis of rotation. The pivoting movement of the body 13 is initially quite slow, because the relative movement of the pinion, the gear reduction and the yoke is much more downward than rearward. However, as the pinion continues to follow the curvature of the rack 43, the rearward component of the movement increases. Consequently, the initial force exerted by the arms 69, 71 is very large while the pivoting movement is slow, but then as the push beam force decreases the speed of the pivoting movement increases. As the pivoting movement progresses, the material carried in the body gravitates rearwardly and dumps therefrom. It will be understood that as the weight of the body load shifts rearwardly, the resisting couple tends to decrease. Such a condition adds materially to the effectiveness of the push beam force couple.

After the material in the body 13 has been dumped, it is only necessary to reverse the direction of the gear reduction and pinion to bring the body to its initial horizontal position. The yoke, to which the gear reduction is affixed, now exerts a tensile force on the arms 69, 71, and the body 13 pivots downwardly to its original horizontal position.

While I have shown my invention in only one form, it will be obvious to those skilled in the art that it is not so limited, but is susceptible of various changes and modifications without departing from the spirit thereof.

I claim:

1. In a dump vehicle having a dump body and a chassis, with said body being fixed to said chassis so as to be pivotable about a first axis from a load carrying to a dumping position, a dump operating mechanism comprising: a push beam structure fixed adjacent one end to said body so as to be pivotable about a second axis which is above and parallel to said first axis, said structure extending forwardly of said second axis; an arcuate rack fixed to said chassis and disposed in a plane perpendicular to said axes with the rack teeth generally facing said dump body; and a gear reduction fixed to the free end portion of said push beam structure and having an output pinion drivingly engaging said rack; with the curvature of said rack being such that ratio of downward to rearward movement of said pinion decreases in general accordance with the magnitude of force required on said push beam structure as said dump body is moved from the load carrying to the dumping position.

2. In a dump vehicle having a dump body and a chassis, with said body being fixed to said chassis so as to be pivotable about a first axis from a load carrying to a dumping position, a dump operating mechanism comprising: a push beam structure fixed adjacent one end to said body so as to be pivotable about a second axis which is above and parallel to said first axis, said structure extending forwardly of said second axis; an arcuate rack fixed to said chassis and disposed in a plane perpendicular to said axes with the rack teeth generally facing said dump body; and a gear reduction fixed to the free end portion of said push beam structure and having an output pinion drivingly engaging said rack; with the curvature of said rack being such that a tangent at the forward end of same is near vertical and a tangent at the rearward end of same is near horizontal.

References Cited in the file of this patent
UNITED STATES PATENTS 1,744,943 Barrett _____ Jan. 28, 1930

FOREIGN PATENTS 62,702 Holland _____ Oct. 15, 1948